United States Patent [19]

Remlaoui

[11] Patent Number: 5,228,641
[45] Date of Patent: Jul. 20, 1993

[54] CASCADE TYPE AIRCRAFT ENGINE THRUST REVERSER WITH HIDDEN LINK ACTUATOR

[75] Inventor: Jihad I. Remlaoui, Oceanside, Calif.
[73] Assignee: Rohr, Inc., Chula Vista, Calif.
[21] Appl. No.: 745,148
[22] Filed: Aug. 15, 1991
[51] Int. Cl.$^5$ .............................................. B64C 25/68
[52] U.S. Cl. .......................... 244/110 B; 239/265.31; 60/226.2
[58] Field of Search ................ 244/110 B, 23 D, 12.5; 239/265.29, 265.31; 60/226.2

[56] References Cited

U.S. PATENT DOCUMENTS

| | | | |
|---|---|---|---|
| 3,262,268 | 7/1966 | Beavers | 60/226.2 |
| 3,511,055 | 5/1970 | Timms | 239/265.31 |
| 4,005,822 | 2/1977 | Timms | 239/265.31 |
| 4,073,440 | 2/1978 | Hapke | 239/265.29 |
| 4,731,991 | 3/1988 | Newton | 60/226.2 |
| 4,807,434 | 2/1989 | Jurich | 239/265.31 |
| 4,827,248 | 5/1989 | Crudden | 244/110 B |
| 4,909,442 | 3/1990 | Fernz | 239/265.29 |
| 4,998,409 | 3/1991 | Mutch | 60/226.2 |

Primary Examiner—Joseph F. Peters, Jr.
Assistant Examiner—Christopher P. Ellis
Attorney, Agent, or Firm—Patrick J. Schlesinger; Frank D. Gilliam

[57] ABSTRACT

A thrust reverser for use with fan jet type aircraft gas turbine engines. A ring around the aft edge of the nacelle is translatable aft to uncover a series of cascade sets, each of which includes a plurality of turning vanes that direct air passing through the cascades in a reverse direction. The actuation system includes a hydraulic cylinder or the like in islands between cascade sets. A blocker door assembly is positioned within the nacelle adjacent to each cascade set during normal engine operation, with the blocker door forming a portion of the inner streamlined wall of the nacelle. The forward end of the door is hingedly secured to a cascade door support and does not move during deployment of the ring. The aft end of the door is hingedly secured to a link, the other end of which is secured to the moving ring. As the ring is translated aft, the door pivots to a position blocking at least part of the air flow through the duct between nacelle and engine core and directs it outwardly though the cascade set. The actuation system is entirely outside the air flow stream both during normal flight operations and reverse thrust operations, avoiding any undesirable interference or drag during these operations.

6 Claims, 1 Drawing Sheet

CASCADE TYPE AIRCRAFT ENGINE THRUST REVERSER WITH HIDDEN LINK ACTUATOR

BACKGROUND OF THE INVENTION

This invention relates in general to cascade type thrust reversers for aircraft turbine engines and, more particularly, to such a thrust reverser having a hidden link actuator.

Modern aircraft fan jet engines have a nacelle or shroud surrounding the engine, spaced outwardly from the core engine cowl to define an annular passage or duct for flow of air rearwardly from the outer portion of an enlarged axial flow compressor. In this type of engine, a large proportion of the total thrust is developed by the reaction to the air driven rearward by the fan and the balance results from ejection of the exhaust gas stream from the engine.

Aircraft using gas turbine engines tend to have high landing speeds, placing great stress on wheel braking systems and requiring very long runways. To reduce this braking requirement and permit use of shorter runways, means are now provided in such engines for reversing a major portion of engine thrust during the landing roll. Many different types of thrust reversers have been designed, of varying effectiveness.

With fan-jet engines, it is possible to block and reverse substantially all of the fan flow without excessive stress on the system, since a large part of the flow, core flow, continues through the engine. In some cases, sufficient reverse flow can be obtained by blocking only a substantial portion of the fan flow.

One type of thrust reverser often used in non-fan type turbine engines, uses a pair of large sturdy clam-shell like blocker doors which swing directly behind the jet exit nozzle and diverge forwardly to reverse thrust. This system must be very heavy and strong. Very complex and sturdy actuators are required for this system, which also tends to undesirable direct much of the reverse flow against aircraft structures.

Another design uses pivotable doors lying in opening in the sidewall of the shroud or nacelle which pivot outwardly while a second set of doors pivot inwardly to block flow of air through the duct and direct it to the outwardly extending doors which direct air flow rearwardly. Typical of these is the system disclosed by Ellis in U.S. Pat. No. 3,612,401. These systems, while useful in fan-jet engines, tend to be heavy and mechanically complex.

Yet another design uses a plurality of pivotable doors located in openings arranged radially around the shroud. Each door pivots so that one end contacts the engine cowl blocking air flow through the annular duct while the other end extends outside the nacelle in a direction directing airflow rearwardly. Typical of these the systems disclosed by Maison et al in U.S. Pat. No. 3,605,411 and Fournier et al in U.S. Pat. No. 4,485,970. These thrust reversers tend to have greater mechanical simplicity than other systems. However, they often require complex actuation systems which may include components extending into the airflow path during normal engine operation, resulting in undesirable drag.

Still another type of thrust reverser uses cascade sets in the sidewalls of the engine nacelle with devices for uncovering the cascades to direct air flow through the cascades, which turn the airflow in a rearward direction. Typical cascade type reversers include those disclosed by Fournier et al in U.S. Pat. No. 4,485,970 and Fernz in U.S. Pat. No. 4,909,442. While often effective in fan-jet engines, these systems are mechanically complex, requiring a great many cooperating components. Generally, parts of the actuation system extend into the air flow stream during normal and/or reverse thrust operation. This results in undesired interference with air flow and wasteful increases in drag.

Thus, there is a continuing need for improved thrust reversing systems for use in aircraft turbine engines which combine highly effective flow reversal with low cost, light weight, mechanically simple actuation systems that do not impede air flow during normal engine operation.

SUMMARY OF THE INVENTION

It is, therefore, an object of this invention to provide a fan jet aircraft engine thrust reversing system of improved efficiency and simplicity. Another object of this invention is to provide a thrust reverser of the cascade type having an improved actuation system. A further object is to provide an actuation system for a thrust reverser that does not intrude into the engine air flow during normal engine operation or into the reverse air flow during reverse thrust operation.

The above-noted objects, and others, are accomplished in accordance with this invention by a thrust reversing system for fan jet type aircraft gas turbine engines which includes a ring forming the aft portion of the engine nacelle that is translatable aft by a series of extensible means, such as hydraulic cylinders or jack screws, a plurality of cascade sets positioned between islands in the space uncovered by the translated ring, a blocker door assembly arranged to cooperate with each cascade set, each blocker door forming the portion of the streamlined inner nacelle wall adjacent to each cascade set during normal engine flight operation.

Each blocker door is hingedly attached at its forward edge to the translating ring and has a single link hingedly attached near its aft end. The second end of the link is hingedly attached to the cascade support which does not move during ring translation. Thus, as the ring translates aft, the link and door pivot to a position substantially blocking air flow through the duct between nacelle and engine core and directing that air flow to and through the corresponding cascade set. The door assembly pivots back to the stowed position when the ring is translated forward to cover the cascade set.

The blocker door assembly and the actuation mechanisms are entirely out of the engine air flow path during normal flight operations, avoiding any undesirable added drag. Also, the actuation system is out of the reverse air flow, assuring maximum thrust reverser efficiency.

BRIEF DESCRIPTION OF THE DRAWING

Details of the invention, and of preferred embodiments thereof, will be further understood upon reference to the drawing, wherein.

DETAILED DESCRIPTION OF PREFERRED EMBODIMENTS

Figure 1:
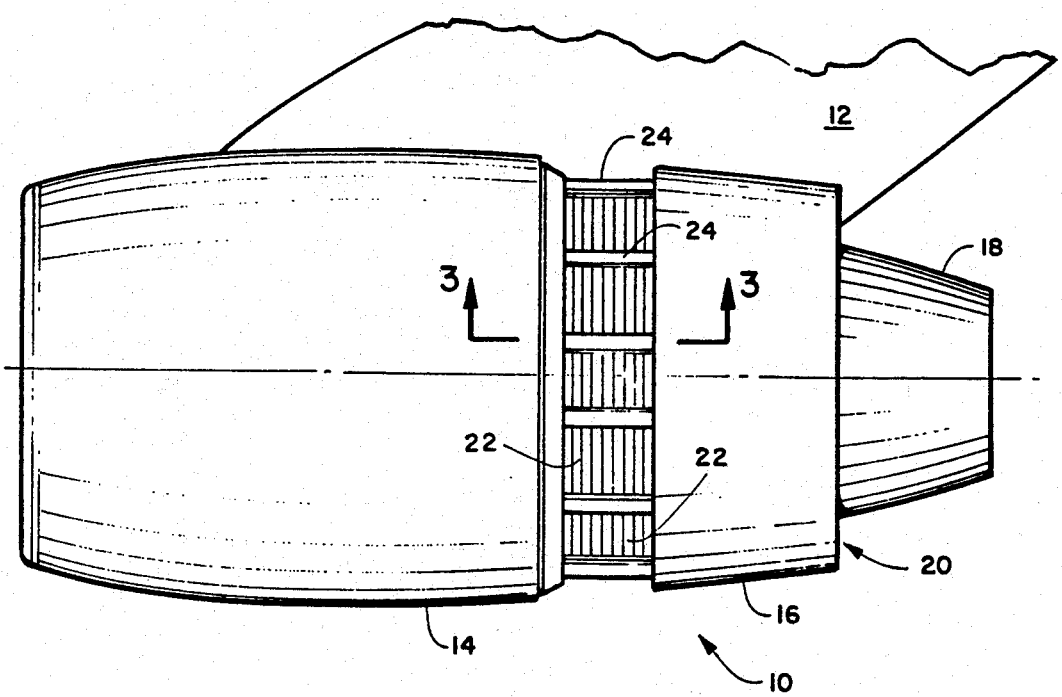
FIG. 1 is a schematic side view of a typical aircraft fan jet engine using the thrust reverser system of this invention.

Referring now to FIG. 1, there is seen an engine 10 of the fan jet type, adapted to be mounted on an aircraft by a pylon 12. Engine 10 includes a nacelle body 14, a movable nacelle ring 16 and an engine core 18. A duct 20 is formed between nacelle body 14 and core 18 for fan air flow.

With ring 16 translated aft as seen in FIG. 1, a plurality of cascade sets 22 are uncovered. Each of cascades 22 includes a plurality of conventional transverse, curved, turning vanes which turn airflow passing out from duct 20 through the cascade sets in an outwardly and forwardly direction relative to engine 10. Islands 24 are provided between cascade sets 22 to support the translation of ring 16, support the sides of cascade sets 22 and provide space for the translation mechanism, as detailed below.

In the stowed position, ring 16 is translated forwardly to cover cascade sets 22 and provide a smooth, streamlined surface for air flow during normal flight operations.

Figure 2:
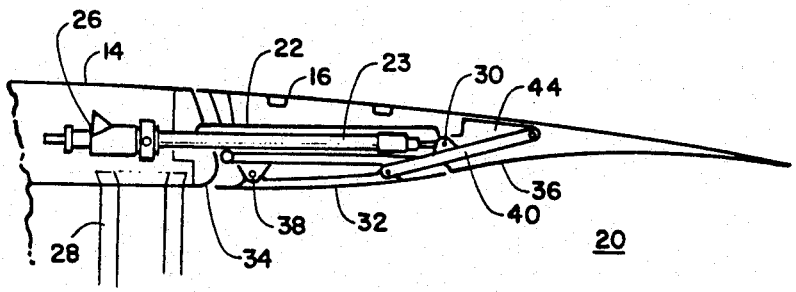
FIG. 2 is a schematic section view taken on line 2—2 with the thrust reverser in the stowed position.
Figure 3:
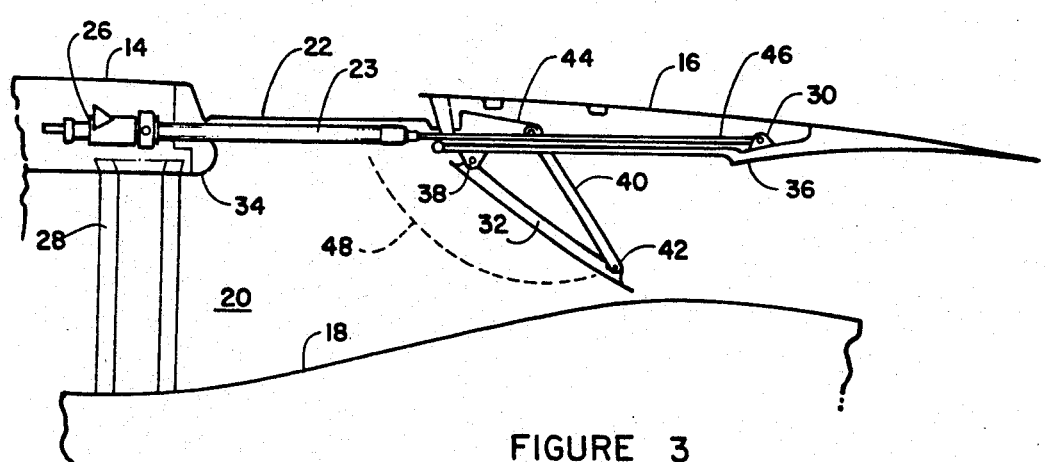
FIG. 3 is a schematic section view taken on line 2—2 with the thrust reverser in the deployed position.

Details of the thrust reverser actuation system are provided in FIGS. 2 and 3, which show schematic section views of the system in the stowed and deployed positions, respectively.

As seen in FIG. 2, ring 16 is in the forward, stowed, position covering cascade 22. The extensible means shown for moving ring 16 in this case is hydraulic cylinder 26, although any other similar system such as a jack screw could be used. A cylinder 26 is located within at least several of islands 24, mounted on nacelle support ring 28 and secured to ring 16 at bracket 30. As seen in these Figures, cylinder 26 somewhat blocks the view of the cascade set 22.

A blocker door 32 forms the inner wall of the nacelle, covering cascade set 22, in the stowed position of FIG. 2. Blocker door 32 cooperates with the adjacent edge 34 of nacelle body 14 and edge 36 of ring 16 to form a smooth, streamlined, low drag internal nacelle surface during normal flight operations.

The forward end of blocker door 32 is hingedly attached to ring 16 by a bracket 38 for movement with ring 16. A link 40 is hingedly attached to the aft inner end of blocker door 32 at bracket 42 and to a support 44 at the aft end of cascade 22.

As seen in FIGS. 2 and 3, when deployment of the thrust reverser is desired, cylinders 26 are actuated, extending rods 46 to translate ring 16 aft, uncovering cascade sets 22. As bracket 38 moves aft with ring 16, blocker door 32 is caused to pivot down to the position shown in FIG. 3, with bracket 42 following the path shown by arc 48. The lower end of blocker door 32 closely approaches core 18, to direct most air flow through duct 20 out through cascade sets 22. The extended end of blocker door 32 extends at a rearward angle to the engine centerline along duct 20 as shown, so that air forces on the door are easily reacted by link 40 and bracket 38.

When normal air flow is desired, hydraulic cylinder 26 is caused to retract rod 46, moving ring 16 back to the stowed position covering cascade sets 22 and swinging blocker doors 32 back to the stowed position.

Other applications, variations and ramifications of this invention will occur to those skilled in the art upon reading this disclosure. Those are intended to be included within the scope of this invention, as defined in the appended claims.

I claim:

1. A thrust reverser system for a fan jet engine which comprises:
   a ring forming the aft portion of an engine nacelle;
   an engine core within said nacelle forming an air flow duct therebetween;
   extensible means for translating said ring aft from a stowed position to a deployed position uncovering a gap between ring and nacelle body;
   a plurality of cascade sets positioned in said gap and secured to said nacelle body;
   a plurality of islands separating said cascade sets said extensible means being located in said islands between said cascade sets entirely outside the air flow stream both during normal flight and reverse thrust operations;
   a plurality of blocker doors, each forming the inner wall of said nacelle adjacent to each of said cascade sets when said ring is in a stowed position;
   each blocker door hingedly attached at the forward end to said ring; and
   a single link member hingedly connected between the aft end of each blocker door and the aft end of the corresponding cascade set;
   whereby as said ring is translated aft by said extensible means to uncover said cascade sets, said blocker door is pivoted to a position substantially blocking air flow through said duct and directing that air flow to the corresponding cascade set.

2. The thrust reverser system according to claim 1 wherein said extensible means is a hydraulic system.

3. The thrust reverser system according to claim 1 wherein all of the actuation components are entirely out of the path of air flow through said duct during normal engine flight operation and entirely out of the air flow deflected by said blocker doors through said cascade sets during reverse thrust operation.

4. The thrust reverser system according to claim 1 wherein blocker doors in the deployed position extend from said nacelle in an inwardly and rearwardly direction toward said core.

5. In a thrust reverser system for a fan jet aircraft turbine engine having a nacelle including an engine body and a ring forming the aft portion of the nacelle, an engine core within said nacelle forming an air duct therebetween, means for translating said ring aft and uncovering an gap between said nacelle body and ring, a plurality of cascade sets in said gap and secured to said nacelle body, a plurality of islands separating said cascade sets and a blocker door associated with each cascade set; the improvement comprising:
   each blocker door forming the inner wall of said nacelle adjacent to each cascade set when said ring is in the forward position;
   each blocker door hingedly attached at the forward end to said ring;
   a single link connected between the aft end of each blocker door and the aft end of each cascade set;
   said translating means positioned within said islands and out of the path of air through said duct during normal engine flight operation and entirely out of the air flow deflected by said blocker doors through said cascade sets during reverse thrust operation;
   whereby as said ring is translated aft to uncover said cascade sets, said blocker doors are pivoted to positions substantially blocking air flow through said duct and directing that air flow through said cascade sets.

6. The improvement according to claim 5 wherein blocker doors in the deployed position extend from said nacelle in an inwardly and rearwardly direction toward said core.

* * * * *